United States Patent [19]

Ferguson

[11] Patent Number: 5,549,822
[45] Date of Patent: Aug. 27, 1996

[54] SHOWER FILTER APPARATUS

[76] Inventor: George E. Ferguson, 303-327 Maitland St., Victoria, B. C., Canada, V9A 7G7

[21] Appl. No.: 372,189

[22] Filed: Jan. 13, 1995

[51] Int. Cl.$^6$ .......................... B01D 27/08; B01D 24/12; B01D 35/02
[52] U.S. Cl. .................. 210/238; 210/282; 210/287; 210/289; 210/441; 210/449; 239/553
[58] Field of Search .................... 210/238, 282, 210/289, 438, 441, 449, 287; 239/553, 553.3, 553.5

[56] References Cited

U.S. PATENT DOCUMENTS

| D. 307,789 | 5/1990 | Kerr ........................ D23/200 |
| D. 313,266 | 12/1990 | Geneve et al. ............. D23/207 |
| D. 316,136 | 4/1991 | Underwood ................ D23/228 |
| D. 348,921 | 7/1994 | Strand et al. .............. D23/228 |
| 2,690,930 | 10/1954 | Corson . |
| 3,204,770 | 7/1965 | Brink ........................ 210/282 |
| 3,829,026 | 8/1974 | Aghnides . |
| 3,831,860 | 8/1974 | Gullaksen . |
| 4,025,438 | 5/1977 | Gelman et al. ........... 210/484 |
| 4,107,046 | 8/1978 | Cordor . |
| 4,637,552 | 1/1987 | Finkbeiner . |
| 4,814,078 | 3/1989 | Stern et al. ............... 210/282 |
| 4,933,080 | 6/1990 | Rundzaitis et al. ...... 210/232 |
| 5,008,011 | 4/1991 | Underwood ............... 210/232 |
| 5,070,553 | 12/1991 | Chambers .................... 4/615 |
| 5,135,654 | 8/1992 | Heskett . |
| 5,152,464 | 10/1992 | Farley .................... 239/553.3 |
| 5,184,480 | 2/1993 | Kolpacke .................. 62/503 |
| 5,192,427 | 3/1993 | Eger et al. ............... 210/133 |
| 5,213,688 | 5/1993 | Robinson ................. 210/440 |
| 5,300,224 | 4/1994 | Farley ..................... 210/266 |
| 5,385,667 | 1/1995 | Steger . |

FOREIGN PATENT DOCUMENTS

| 3641455 | 8/1988 | Germany . |
| 4039329 | 7/1991 | Germany . |
| 661306 | 7/1987 | Switzerland . |

Primary Examiner—Thomas M. Lithgow
Attorney, Agent, or Firm—David G. Rosenbaum

[57] ABSTRACT

The water purification filter is coupled intermediate any conventional shower head feed pipe and shower head. The filtration device is toroidal with a serpentine flow path. The filtration device envelopes the feed pipe which enables the shower head to remain within substantially the same location as before the insertion of the filter. To purify the shower water, the filter contains a filter media coupled between two filter screens.

15 Claims, 2 Drawing Sheets

SHOWER FILTER APPARATUS

FIELD OF THE INVENTION

This invention generally relates to a water purification device placed at a shower head and more particularly to an improved, compact shower filter that is coupled intermediate any conventional shower head feed pipe and shower head. The filter is toroidal with a serpentine flow path.

BACKGROUND OF THE INVENTION

Improved health and hygiene in the United States and other countries has become a major concern. With the spread of disease and viruses, people are demanding a safer and cleaner environment. Water quality is a major component for improving our health and safety standards. Many water sources are of substandard quality and are becoming increasingly polluted. Most water supplies contain at least trace amounts of contaminants, such as hazardous chemicals, bacteria or suspended particles. Whether public or private, all water supplies are at risk of being polluted by contaminants. The contaminants may cause unpleasant odors, eye irritation, sickness, skin rashes, or with long term exposure, cancer. Some chemical contaminants may be absorbed through the skin while showering. A need exists for a device to purify shower water.

Odors are particularly noticeable in shower water because the warm water spray on the user promotes water evaporation, produces droplets, and creates a fine mist which permeates the air and is ingested. Due to the enclosed confines of a shower, odorous substances enter the air and are sensed at higher levels than water from a faucet. A need exists for a shower filter that can eliminate water odors.

People use different techniques to purify the water so that it can be used for drinking, cooking and bathing purposes. The installation of water purification systems and the use of bottled water is becoming increasingly popular. Many chemicals, such as chlorine, are added to the water supplies to purify the water. A shower filter with a filter media, such as activated charcoal, substantially eliminates chlorine odor and other odors by removing the odorous substances from the water before the water is ejected from the shower head. To prevent the growth of bacteria or fungus in the shower head or shower area, a shower filter may also add a bactericide or fungicide to the water. A need exists for a shower filter that can purify water and the entire shower area.

Most shower pipes are installed at a sufficient height for the average person. Many known shower filters protrude from their connection to the water pipe or cause the shower head to be positioned lower in the shower and farther from the wall. The new arrangement results in a reduction of available headroom and general shower space. The reduction in shower space increases the possibility that users will have to lean over to position their head beneath the water discharge area. A need exists for a shower filter that does not reduce the headroom beneath the shower nozzle.

For many years, filters placed at a shower head have been available for purchase. Included within current patent literature are many devices which are directed to the basic concept of filtering the shower water.

The Farley patent, U.S. Pat. No. 5,152,464, issued in 1992, discloses a shower filter assembly. The filter housing is generally toroidal with a recessed inlet that leads into an internal chamber. The water travels through a filter screen and impinges upon a baffle which deflects the water laterally into an filter medium. The outlet includes a shut-off valve and a mounted shower head. The baffle in the Farley patent directs the water through a narrowed opening into the filter medium, which is likely to result in displacement of the filter medium and flow channeling, thereby reducing the filtering efficiency of the filter.

The Underwood patent, U.S. Pat. No. 5,008,011, issued in 1991, discloses a shower decholorinator using granulated copper alloy filter material. The cylindrical device is coupled between the feed pipe and the shower head. The patent discloses two filters perpendicular to the direction of water flow and a filter media with a serpentine flow path; however, the filter screens do not cover a large surface area. The patent does not radially disperse nor redirect the water flow and does not employ a generally toroidal housing.

The Brink patent, U.S. Pat. No. 3,204,770, issued in 1965, discloses a portable water softener. The device is toroidal in shape with a filter media, between two screens, that allows for a serpentine flow path. The water is radially divided into four quadrants and is redirected by a splash plate. The velocity of water causes a violent mixing action which allows a free water flow that contacts all of the particles in the container and all sides of the particles.

The Kolpacke patent, U.S. Pat. No. 5,184,480, issued in 1993, discloses an accumulator for vehicle air conditioning systems. The accumulator contains an inlet port, outlet port and a desiccant container, through which incoming refrigerant flows. The incoming refrigerant is initially directed against a screen and an underlying filter covering the desiccant container. All of the refrigerant pools in the bottom of the accumulator, where it is evaporated into the low pressure atmosphere of the accumulator. The suction created by the compressor draws the oil and refrigerant mixture up through the first end and through the quill, after which the mixture is metered back through a second end. This patent shows a toroidal geometry and serpentine flow. The filter media in this patent is very thin and operates based upon an evaporation process.

The Gelman, et al. patent, U.S. Pat. No. 4,025,438, issued in 1977, discloses a water filter device. The patent contains a water filter and a removable water filter cartridge having three layers of varying pore sizes. The water is radially dispersed before entering the filter. Again, this patent shows a toroidal geometry and serpentine flow. The filter media in this patent is very thin and the water is not fully redirected. This patent also does not contain a filter media coupled between two filter screens.

The Stern, et al. patent, U.S. Pat. No. 4,814,078, issued in 1989, discloses a water filter cartridge. The cartridge has a closed housing with an inlet and outlet formed on the same surface. An elongated sleeve of filter material distributes the filtration over a considerable area instead of concentrating it in a relatively small area. Because the inlet and outlet is on the same surface, the filter would not be able to envelope the feed pipe, but instead, must be located to the side of the feed pipe. The water is not redirected before entering the filter media and the filter media is not coupled between two filter screens.

The Farley patent, U.S. Pat. No. 5,300,224, issued in 1994, discloses a fluid treatment device. The device contains a one piece filter assembly with a reusable filter and a removable diverter/screen element for adding or removing zinc. The inlet element redirects flow horizontally before entering the filter media. The redirected water flows directly into the filter media instead of flowing along a vertical path.

The Robinson patent, U.S. Pat. No. 5,213,688, issued in 1993, discloses a shower water filter assembly. A cavity portion of the housing, containing the filter element, is laterally displaced from the inlet and outlet along the line of the shower pipe. The filter element can, therefore, be located vertically above the water inlet and outlet, so the height of the shower head is not reduced by the interspersed filter assembly. The patent redirects the water into a filter media with a serpentine flow but no filter screens are incorporated into the system. The filter media provides a large surface area; however, its hollow cylindrical shape does not allow for a thick body of filter medium.

The Eger, et al. patent, U.S. Pat. No. 5,192,427, issued in 1993, discloses shower filters and accessories. The patent contains a filter and bypass adapter which allows the filter to be displaced from the direct line leading from the feed pipe. Simultaneous operation of two couplers is possible. The housing may hold cosmetic containers. The device of this patent is not toroidal in shape and is not entirely coupled between the feed pipe and the shower head, so the device occupies extra space in the shower.

The Chambers patent, U.S. Pat. No. 5,070,553, issued in 1991 discloses a shower head assembly with a valve to selectively control fluid flow through the shower head. The upper inlet conduit mounts to an existing shower head. A flexible hose is mounted to the outlet conduit for a dental cleaning operation. Because the device mounts to the existing shower head, a large displacement of the shower head occurs. The water inflow is not redirected before entering the filtering section of the apparatus, but is in-line with the longitudinal axis of the filter.

The Rundzaitis, et al. patent, U.S. Pat. No. 4,933,080, issued in 1990, discloses a housing with replaceable filter cartridge for use with a shower head. The device is installed between the plumbing pipe and the shower head and may be adapted for different filter cartridges. A three position valve can adjust the flow of water. The patent allows serpentine flow through the filter media, but it does not radially disperse the water before entering the filter. The filter disclosed in this patent is not toroidal in shape and, therefore, does not accommodate the feed pipe, but instead, extends from the shower assembly and occupies extra space in the shower.

The Strand, et al. design patent, U.S. Design Patent No. 348,921, issued in 1994, discloses a combined water filter, flow regulator and shower head. The Geneve, et al. design patent, U.S. Design Pat. No. 313,266, issued in 1990, discloses a shower filter. The Underwood design patent, U.S. Design Patent No. 316,136, issued in 1991, discloses a combined shower head and filter. The Kerr design patent, U.S. Design Patent No. 307,789, issued in 1990, discloses a shower filter. All of these design patents show a filter that is coupled between the feed pipe and the shower head. The devices described in the patents are not toroidal so they do not envelope the feed pipe, but instead, extend from the shower assembly and occupy extra space in the shower.

The foregoing patents indicate that while conventional shower filter devices exist, they each suffer from the principal disadvantage of impinging significantly upon the shower headroom by extending, unnecessarily, the length of the shower head feed pipe. The present shower filter contains important improvements and advances upon conventional shower filter devices by offering a housing which minimizes extension in the headspace of the user while maximizing the filter medium surface area for water filtration.

SUMMARY OF THE INVENTION

Accordingly, it is a broad aspect of the present invention to provide for a filtration device placed at a shower head.

It is a further object of the present invention to provide a filtration device having a toroidal geometry.

It is a further object of the present invention to provide a recessed inlet which enables the shower head to remain in substantially the same location as before the insertion of the filter.

It is a further object of the present invention to provide a filtration device that radial disperses water over a large surface area.

It is a further object of the present invention to provide a filtration device that allows the introduction of water directly into the full filter media for more efficient filtration.

It is a further object of the present invention to provide a filtration device with filter screens surrounding a filter media which causes serpentine flow.

It is a further object of the present invention to provide a filtration device containing a shower filter coupled between any conventional feed pipe and shower head.

It is a further object of the present invention to provide a filtration device that is easy to manufacture.

It is a further object of the present invention to provide a filtration device that is easy to install.

It is a further object of the present invention to provide a filtration device that is compact and low profile.

It is a further object of the present invention to provide a filtration device that provides long-term filtering capabilities.

It is a further object of the present invention to provide a filtration device that provides maximum filtration.

It is a further object of the present invention to provide a filtration device that takes up a minimum amount of space.

It is a further object of the present invention to provide a filtration device that may be nested with further compact shower filters to provide additional filtering capability.

It is a further object of the present invention to provide a filtration device that will not restrict flow and will maintain the high flow capabilities of the shower head at an adequate level.

It is a further object of the present invention to provide a filtration device that will not allow the water to displace the filtration media or cause channeling, thus maintaining the filtering capabilities of the device over time.

It is a further object of the present invention to provide a filtration device that is manufactured as one unit and the entire unit is replaced after a length of time.

It is a further object of the present invention to provide a filtration device that may be easily opened for replacement of the filter screen and filter media.

The foregoing objectives are met by the present device which contains a filtration device coupled intermediate any conventional shower head feed pipe and shower head. The filtration device is toroidal with a serpentine flow path. The filter envelopes the feed pipe allowing the shower head to remain within substantially the same location as before the insertion of the filtration device. To purify the shower water, the filtration device contains a filter media retained between two filter screens composed of a non-woven or microporous polyethylene material, such as that sold under the trademark POREX.

The water enters into the bottom of the filtration device and is immediately radially dispersed and redirected to the top of the filtration device. The water pressure forces the water through a first filter screen then a filter media. Finally, the water recombines, passes through a second filter screen, exits the filter device and enters the shower head.

These and other objects, features and advantages of the present invention will become more apparent to those skilled in the art from the following more detailed description of the non-limiting preferred embodiment of the invention taken with reference to the accompanying Figures.

BRIEF DESCRIPTION OF THE DRAWINGS

Briefly summarized, a preferred embodiment of the invention is described in conjunction with the illustrative disclosure thereof in the accompanying drawings, in which.

DETAILED DESCRIPTION OF THE PREFERRED EMBODIMENT

Figure 1:
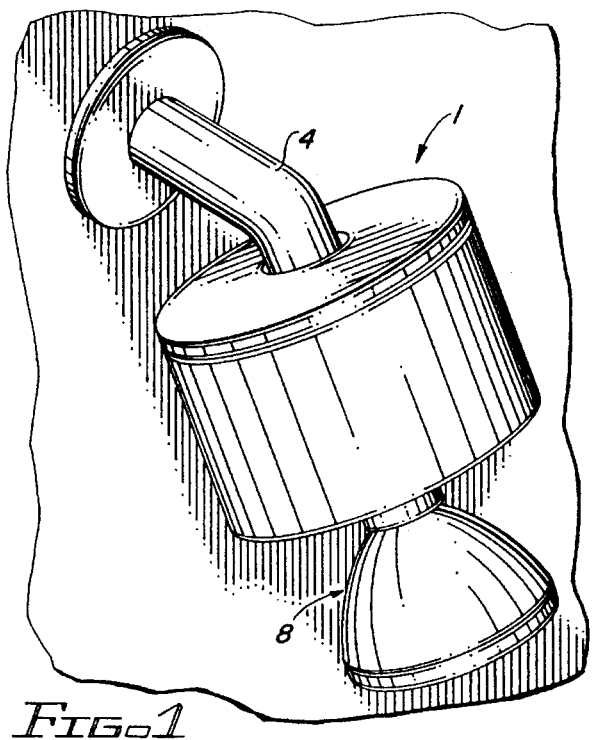
FIG. 1 is a perspective view showing a preferred embodiment of the present invention incorporated onto a shower head.
Figure 2A:
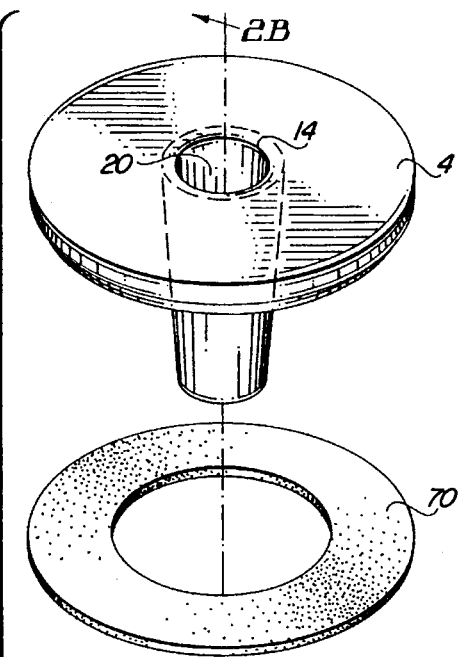
FIG. 2A is an exploded perspective view of the filtration device in accordance with the preferred embodiment of the present invention.
Figure 2B:
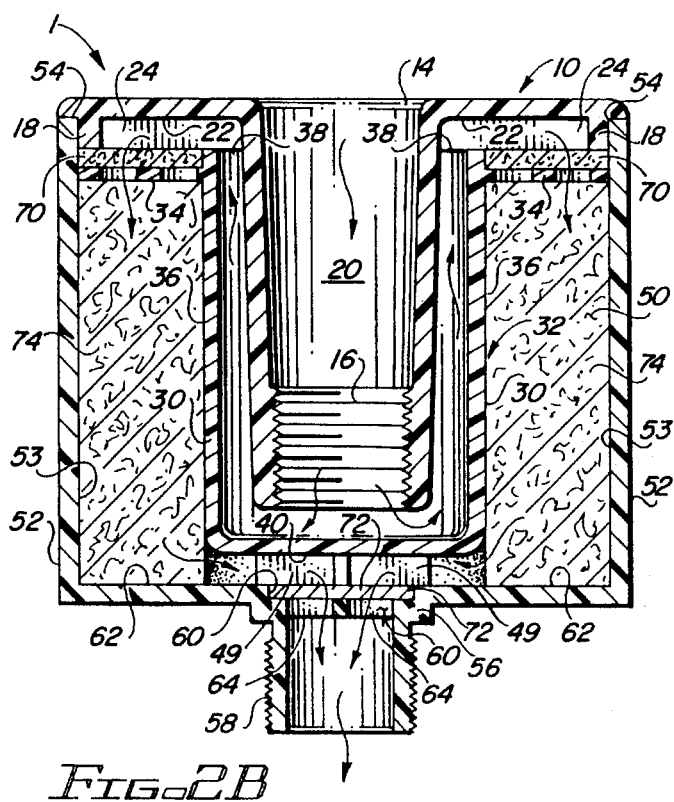
FIG. 2B is a longitudinal cross-sectional view taken along line 2B—2B of FIG. 2A showing a preferred embodiment of the present invention.
Figure 3:
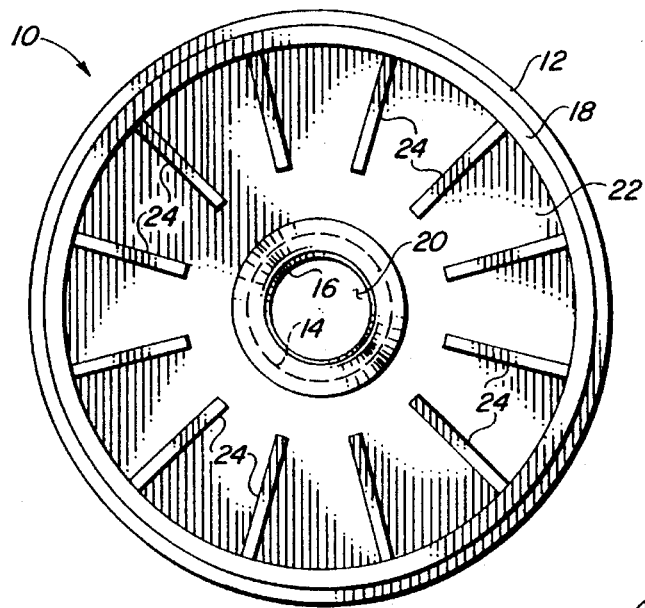
FIG. 3 is a bottom plan view showing a preferred embodiment of the cover of the present invention.
Figure 4:
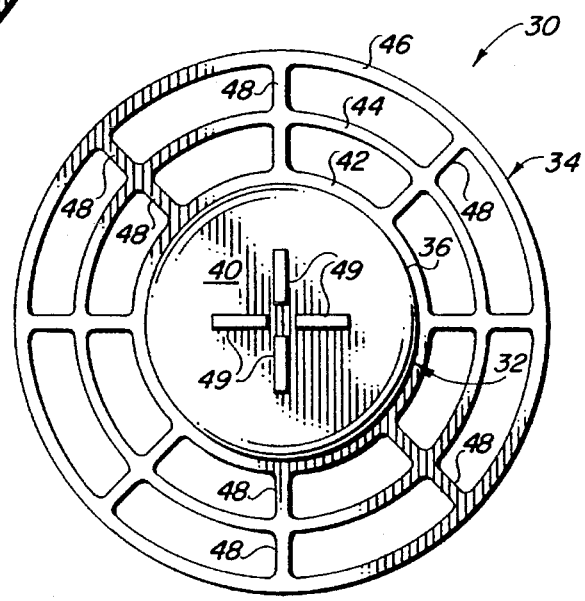
FIG. 4 is a bottom plan view showing a preferred embodiment of the baffle of the present invention.
Figure 5:
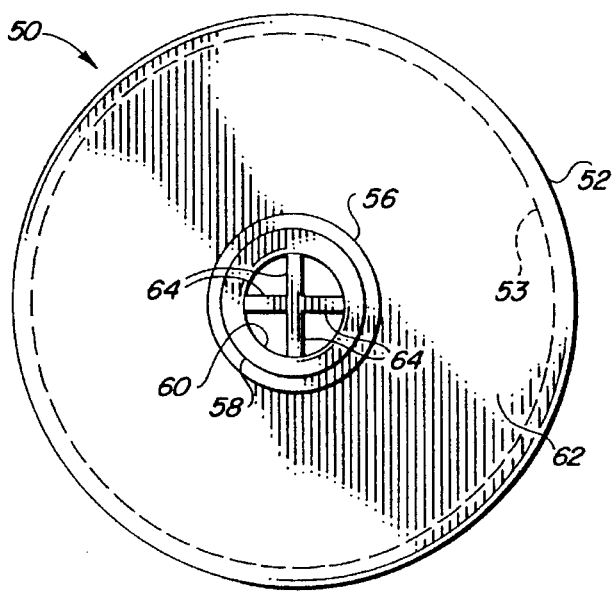
FIG. 5 is a bottom plan view showing a preferred embodiment of the chamber of the present invention.

Referring particularly to the drawings, the elements of the shower filtration device 1 of the present invention are shown.

The inventive shower filtration device 1 consists generally of a exterior housing 2, a cover member 4, a baffle member 6 and a filter medium 8. In accordance with the preferred embodiment of the inventive shower filter 1, the exterior housing 2, the cover member 4 and the baffle member 6 are made of a plastic material, such as polyvinyl chloride (PVC) or other suitable water-stable plastic material.

The cover member 4 consists of a planar generally circular upper cover portion 10 having centrally located circular opening 14 passing therethrough. The cover member 4 may include threads (not shown) to removably engage the cover member with the housing 2, or may be non-removably coupled to the housing 2 during manufacture such as by ultrasonic welding. An elongated recessed inlet 20 emanates downwardly from the circular opening 14. The recessed inlet 20 may be straight-walled or tapered to form an internally threaded inlet port 16 at an end of the elongated recessed inlet 20 opposite the circular opening 14. A circular ring member 18 is centered upon and is preferably, though not necessarily, integral with a bottom 22 of the circular cover 10. The circular ring 18 has a diameter smaller than the diameter of the bottom 22 of the circular cover 10. A plurality of slat members 24 emanate radially inward from the circular ring 18 and are preferably, thought not necessarily, integral with the bottom 22 of the circular cover 10. The plurality of slat members 24 are preferably not in contact with the recessed inlet 20 of the cover member 10.

A baffle member 30 is formed as a cylinder 32 having an open top end 38, a closed bottom end 40 and an outside 36. The baffle member 30 reciprocally receives the recessed inlet 20 of the cover 10 within the cylinder 32 such that the plurality of slats 24 of the cover 10 rest adjacent the top end 38 of the baffle member 30. A circular lattice 34 forms planar annular ring extending radially outward the open top end 38 of the cylinder 32. In accordance with the preferred embodiment of the invention, the circular lattice 34 includes a plurality of concentric rings 42,44,46 and a plurality of evenly spaced radially projecting support bars 48. The support bars 48 are in co-planar with the concentric rings 42,44,46. It is preferably to form the circular lattice 34 in a manner such that it is not co-planar with the top end 34 of the baffle member 30, thereby forming a recess to accommodate an annular filter member 70. The outermost section of the circular lattice 34 is positioned to mate with the circular ring 18 on the bottom 22 of the cover 10, when the filtration device 1 is in its assembled condition. In this manner, the outer ring 18 of the cover member 10 serves to retain the annular filter member 70, within the recess formed by the circular lattice 34.

At a bottom end 40 of the baffle member 30, a plurality of downwardly protruding legs 49 are formed. Each of the plurality of downwardly protruding legs 49 preferably extend radially from a center axis of the baffle member 30 and are laterally separated forming a plurality of fluid flow channels between adjacent pairs of legs 49.

A chamber 50 includes a first cylinder 52 having an open top end 54, a closed bottom end 62 and an inside surface 53. The baffle 30 is positioned in the chamber 50, with the legs 49 of the baffle 30 resting on the bottom 62 of the chamber 50. The third ring 46 of the lattice 34 is positioned below the top end 54 of the chamber 50 and against the inside surface 53 of the chamber 50. The outside of the circular ring 18 of the cover 10 is removably positioned against the inside surface 53 of the top end 54 of the chamber 50. The bottom 22 of the cover 10 rests upon the top end 54 of the chamber 50. The center of the bottom end 62 of the chamber 50 contains a circular outlet port 60. A circular ring 56, having the same outside diameter as the circular port and a smaller inside diameter, contains two (2) perpendicular crossbars 64 centered within the circular ring 56. A second externally threaded cylinder 58 being integral with and having the same diameter as the circular ring 56 emanates downwardly from the circular ring 56. The shower head 8 is threadedly received onto the second cylinder 58.

The annular filter 70 is preferably composed of a non-woven, microporous, polyethylene material and is sized to mate with the recess formed by the circular lattice 34. A circular filter screen 72, also preferably composed of a nonwoven, microporous polyethylene material has the same diameter as and rests adjacent the outlet port 60 in the bottom 62 of the chamber 50.

A filter media 74, preferably composed of activated charcoal, zeolite, KDF, or such other filter media as are known in the art, is positioned below the circular lattice 54 and between the outside 36 of the baffle cylinder 32 and the inside surface 53 of the chamber 50. In accordance with an alternative embodiment of the present invention, the filter media 74 may be retained with a generally torroidal-shaped filter cartridge 80 which is insertable between the baffle member 30 and the housing 2 during assembly thereof. The filter cartridge has a plruality of apertures 82 passing through upper and lower surfaces thereof to facilitate fluid flow therethrough.

The opening 14 of the filtration device receives a shower stem pipe 4. The end of the shower stem pipe 4 is threadedly received into the a threaded inlet port 16 of the cover 10. The water contacts the bottom 40 of the baffle 30 and is immediately radially dispersed and redirected into the space between the recessed inlet 20 and the baffle 30. The water pressure forces the water outside the baffle 30 and over the entire surface area of the annular filter screen 70 and the circular lattice 34. The water flows downwardly throughout the volume of filter media 74 before recombining through the circular filter screen 72 and exiting the outlet port 60 of the chamber 50. Finally, the water exits the filtration device 1 and enters a shower head 8, which is threadedly received onto the outlet port 60 of the chamber 50. Where the cover 10 is threadedly engaged upon the housing 2, the cover member 10 is easily removed from the chamber 50 for replacement of the annular filter screen 70, circular filter screen 72 and filter media 74.

Alternative embodiments include the ability to nest the filtration device 1 in series with further filtration devices 1 to provide additional filtering capability.

To prevent the growth of bacteria or fungus in the shower head or shower area, another alternative embodiment includes the filter media 74 containing a bactericide or fungicide which is picked up by the water flow. Another alternative embodiment includes the filtration device 1 being manufactured as one unit with ultra sonic welding which cannot be opened. The entire unit may be replaced after a length of time.

It will be apparent to those skilled in the art, that the foregoing detailed description of the preferred embodiment of the present invention is representative of a type of filtration device within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

I claim:

1. A filtration device, comprising:
   (a) an external housing defining a chamber having an open first end, a closed second end, an outlet port on said second end, an inside surface and a diameter, said outlet port of said chamber reciprocally receiving a shower head;
   (b) a baffle member having a first end, a second end, an outside surface, a tubular projection extending downwardly from said first end of said baffle member and comprising the second end of the baffle member, said tubular projection having a closed end at the second end of the baffle member and an open end at the first end of the baffle member, said baffle member further including a circular lattice projecting radially outward from a central axis of the baffle member proximate the first end of the baffle member, said baffle member is located within said chamber;
   (c) at least one filter medium disposed within a space defined between said first end of said baffle member and said inside surface of said housing;
   (d) an annular filter screen member positioned adjacent the circular lattice of the baffle member;
   (e) a cover member having a top which covers said first open end of said external housing, a bottom and a recessed inlet located within said baffle member and which is adapted to receive a shower stem therein, thereby allowing a shower head coupled to the outlet port of the chamber to the to remain in substantially the same position relative to the shower stem as before the fixation of the filtration device.

2. The filtration device of claim 1 wherein said housing, said baffle member and said cover member are made of a plastic material.

3. The filtration device of claim 1 wherein said cover member further includes a plurality of supports, said plurality of supports extending from said bottom of said cover and spaced radially inward without contacting said said recessed inlet,said supports defining fluid flow channels in fluid flow communication with said at least one filter medium.

4. The filtration device of claim 1 wherein said circular lattice further comprises a plurality of co-planar concentric rings and radially extending support bars interconnecting the plurality of co-planar concentric rings.

5. The filtration device of claim 4, wherein said circular lattice emanates from a location on said baffle member slightly inferior to said first end of said baffle member, said circular lattice being positioned adjacent to said inside surface of said chamber thereby supporting said annular filter screen member.

6. The filtration device of claim 1 wherein said baffle member further includes a plurality of legs depending from a bottom surface thereof, said plurality of legs radially emanating from said center of said outside surface of said second end of said baffle, each of said plurality of legs being separate from one another, said plurality of legs subtending said outlet port of said chamber thereby allowing filtered water to exit said outlet port.

7. The filtration device of claim 1 wherein said cover member is removably coupled to said housing.

8. The filtration device of claim 1 wherein said at least one filter medium contains a bactericide.

9. The filtration device of claim 1 wherein said at least one filter medium contains a fungicide.

10. The filtration device of claim 1, further including a filter screen positioned adjacent said outlet port of said chamber.

11. The filtration device of claim 1, further including a generally torroidally shaped filter cartridge containing said at least one filter medium therein.

12. The filtration device of claim 11, wherein said at filter cartridge further includes a plurality of apertures passing through an upper surface and a lower surface thereof, thereby accommodating an inflow of water therethrough.

13. A filtration device, comprising:
   (a) an external housing defining an interior chamber having an open first end, a closed second end, an outlet port on said second end, an inside surface and a diameter, said outlet port of said chamber reciprocally receiving a shower head;
   (b) a baffle member having a first end, a closed second end, an outside surface, and a generally tubular projection depending centrally from the first end of the baffle member and defining the closed second end of said baffle member;
   (c) at least one filration medium disposed within a space defined between said first end of said baffle member, said annular, generally tubular projection of said baffle member and said inside surface of said housing;
   (d) at least one annular filter member positioned adjacent the first end of the baffle member;
   (e) a cover member having a top which covers said first end of the external housing, a bottom and a recessed inlet adapted to receive a shower stem therein, said reccesed inlet being co-axially positioned within said generally tubular projection of said baffle member, whereby water passing through the recessed inlet impinges upon the closed end of the generally tubular projection of the baffle member is directed towards the open end of the generally tubular projection of the baffle member and communicated onto the at least one annular filter member, said cover member further includes a plurality of support extending from the bottom of said cover member and spaced radially inward without contacting said recessed inlet, said support defining fluid flow channels in flow communication with said at least one filter member;

whereby a shower head coupled to the outlet port of the chamber remains in substantially the same position relative to the shower stem as before the fixation of the filtration device to the shower stem.

14. The filtration device of claim 13 wherein said first end of said baffle member further comprises a circular lattice extending radially outward proximate the first end of the baffle member.

15. The filtration device of claim 14, wherein said annular filter screen member is interdisposed between said circular lattice and the supports in the bottom of the cover member.

* * * * *

UNITED STATES PATENT AND TRADEMARK OFFICE
CERTIFICATE OF CORRECTION

PATENT NO. : 5,549,822
DATED : August 27, 1996
INVENTOR(S) : George E. Ferguson

It is certified that error appears in the above-indentified patent and that said Letters Patent is hereby corrected as shown below:

Column 8, Line 7, delete "said". (second occurrence)

Column 8, Line 56, delete "filration", insert --filtration--.

Column 9, Line 7, delete "support" and insert therefore --supports--.

Signed and Sealed this

First Day of July, 1997

Attest:

BRUCE LEHMAN

*Attesting Officer*   *Commissioner of Patents and Trademarks*